July 14, 1925.  1,545,776
W. KAISLING
AMMETER
Filed Dec. 28, 1918
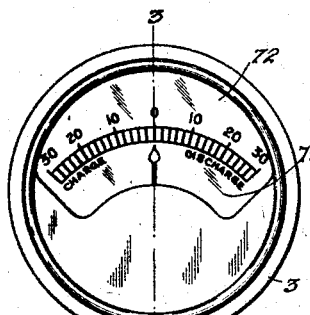
Fig.1.
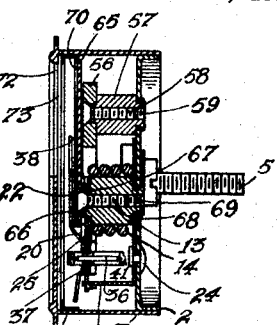
Fig.3.
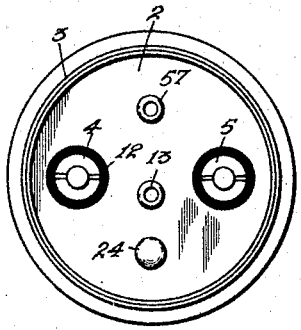
Fig.2.
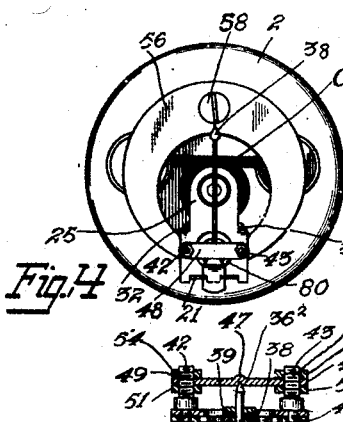
Fig.4.
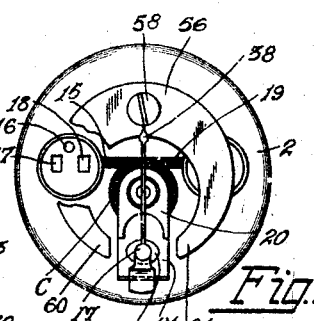
Fig.5.
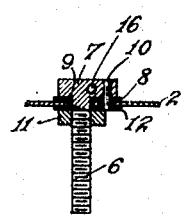
Fig.8.
Fig.6.
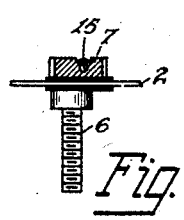
Fig.7.
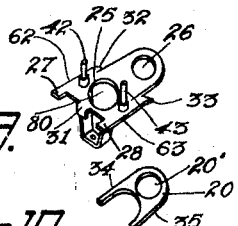
Fig.9.
Fig.10.
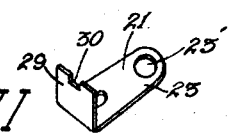
Fig.11.
Inventor:
William Kaisling
By Curtis B Camp
Attorney Patented July 14, 1925.

1,545,776

UNITED STATES PATENT OFFICE.

WILLIAM KAISLING, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

AMMETER.

Application filed December 28, 1918. Serial No. 268,675.

*To all whom it may concern:*

Be it known that I, WILLIAM KAISLING, a citizen of the United States of America, residing at Chicago, in the county of Cook and State of Illinois, have invented certain new and useful Improvements in Ammeters, of which the following is a specification.

My invention relates in general to a device for visualizing and measuring the direction flow of current in an electrical circuit, such devices commonly being known as ammeters, and is particularly adapted for use in connection with the ignition and lighting circuits of an automobile or the like. However, I do not wish to be limited to this particular use of my device, as it is at once apparent that my device may be connected in any circuit where it is desirable to know the direction flow of current and also the amount of the current flow.

In the present systems of lighting and ignition as used in connection with automobiles, a motor generator and a storage battery are provided, the generator producing the current and the battery storing it for future use. Due to the varying amounts of current consumed by the apparatus, it is desirable to know whether the generator is producing sufficient current to supply the apparatus, or whether the battery or accumulator is supplying the current for carrying the load, and to know the amount of current that is being sent into the accumulator or discharged therefrom. To this end my invention is particularly adapted so that the operator of an automobile may at a glance know the working conditions of the circuits associated with the automobile.

It is the object of my invention to produce an improved device of this class which will embody desirable features and advantages in a simple, efficient and economical manner; and to the accomplishment of this object and such others as may hereinafter appear, the invention consists in the novel details of construction, parts and combination of parts described, and particularly pointed out in the appended claims, reference being had to the accompanying drawings forming a part hereof, in which the same reference characters indicate like parts throughout the several views, and in which:—

Fig. 1 is a front view of the device of my invention;

Fig. 2 is a rear view of Fig. 1, showing the terminals;

Fig. 3 is a sectional view of the line 3—3 of Fig. 1;

Fig. 4 is a front view of the device with the cover and indicating dial removed;

Fig. 5 is a front view of the device similar to that of Fig. 4, but with parts broken away to more clearly illustrate the structure;

Fig. 6 is an enlarged sectional view showing the supporting means of the indicator;

Fig. 7 is a sectional view of one of the terminals showing the method of securing one end of the winding of the ammeter to the terminal;

Fig. 8 is another sectional view of the terminal showing its construction;

Fig. 9 is a perspective view of the bridge which supports the indicator arm and armature;

Fig. 10 is a perspective view of one of the pole pieces of the device, and

Fig. 11 is a perspective view of the other pole piece of the device.

Referring now more in detail to my invention as illustrated, it comprises a shallow cup-shaped mounting plate 2 upon which the operating mechanism of the device is mounted, and a cover or cap 3 for enclosing and protecting the mechanism. A pair of terminals 4 and 5 are provided, both being similarly constructed and by describing terminal 4, the construction of terminal 5 will be readily apparent. The terminal 4 is provided with a threaded shank 6, which passes through the plate 2, and with an eccentrically disposed head 7. The terminal 4 is insulated from the plate 2 by means of a pair of insulation washers 8 and 12 and an insulation bushing 9. To prevent the terminal 4 from rotating, a pin 10 is provided which passes through suitably aligned openings in the head 7 and plate 2. A clamping nut 11 is provided and has screw-threaded engagement with the threaded portion 6 of the terminal, which nut 11 securely clamps the terminal to the plate 2.

A stud or core 13 of soft iron is provided and is suitably secured to the plate 2 in any suitable manner as by means of a riveting operation, as illustrated in the drawings. A coil C which is adapted to receive current, the direction of flow of which is to be indicated by the movable member M, is constructed of a few turns of suitable insulated wire 14 and wound around the core 13, as most clearly shown in Fig. 3. The ends of the coil C are secured to the terminals 4 and 5 in a manner now to be described. A suitable opening 16 is provided in the head 7 of the terminal 4 and is of a size to receive the end 15 of the coil C. After the end 15 has been inserted in to the opening 16 of the terminal 4, the surface of the head 7 is swaged at the points 17 and 18. The swaging of the head 7 at the points 17 and 18 by means of a suitable tool forces the metal down against the end 15 of the coil C, thus securely holding it in place in the head 7. The end 19 of the coil C is secured to the head of the terminal 5 in the manner just described. Pole pieces 20 and 21 are provided, pole piece 20 being constructed of a strip of suitable material and having an orifice 20' of a size to fit over the reduced portion 22 of the core 13. The said pole piece when in position rests upon the shoulder formed by the reduced portion 22 of the core 13. The pole piece 21 is L shaped and is constructed of suitable material, such as soft iron. The leg 23 of the pole 21 is mounted between the core 13 and the plate 2, the said leg 23 being provided with an orifice 23' of a size to receive the reduced portion of the core 13, which passes through the plate 2 for riveting purposes.

The pole piece 21 is also secured to the plate 2 by means of a rivet 24 which holds the said pole piece 21 in place, and also aligns it centrally with relation to the core 13. To centrally locate and align the pole piece 20 with relation to the pole piece 21 and core 13, I provide a bridge plate 25 which serves as an aligning means for the pole piece 20, and also serves as a supporting means for the armature suspension. The bridge plate 25 is provided with an orifice 26 of a size to receive the reduced portion 22 of the core 13 and its other end is provided with extended tongues 27, 28 between which the leg 29 of the pole piece 21 fits. The leg 29 of the pole piece 21 is provided with a notch 30 in which a centrally located angularly disposed tongue 31, formed integrally with the bridge plate 25 rests. The bridge plate 25 is provided with downwardly extending prongs 32 and 33, which prongs engage the respective sides or edges 34 and 35 of the pole piece 20 to hold it in alignment. The bridge plate 25 aligns itself centrally with relation to the core 13 and the pole piece 21, and the prongs 32 and 33 thereof engaging the pole piece 20, align the said pole piece 20 with relation to the core 13 and pole piece 21.

A rotatable shaft 36, for pivotally supporting the armature 37 and indicator needle 38, is provided. To secure the armature 37 and needle 38 to the shaft 36, I provide a shouldered sleeve 39. The sleeve 39 is provided with an orifice slightly smaller than the shaft 36 so that it can be forced upon the shaft 36 to produce a forced fit between the shaft 36 and the sleeve 39 to hold the armature 37 and needle 38 in position upon the shaft 36. The armature 37 and needle 38 are each provided with openings of a size to receive the sleeve 39, the said needle 38 resting between the upper shouldered portion of the sleeve 39 and the armature 37. The sleeve 39 protrudes slightly beyond the armature 37 and this protruding portion is staked to hold the armature 37 and needle 38 upon the sleeve 39. To pivotally support the shaft 36, armature 37 and indicator needle 38 as a whole in place between the pole pieces 20 and 21, I provide a U-shaped member 41 which is secured to the bottom surface of the bridge plate 25 by means of the studs 42 and 43, which are provided with reduced portions 42' and 43', which extend through suitable aligned openings in the bridge plate 25 and member 41. The ends of the reduced portions 42' and 43' are upset to securely stake the studs 42 and 43 to the plate 25 and also secure the member 41 to the plate 25. The bridge plate 25 is also provided with an opening 80 through which the shaft passes, and is of a size to permit the rotation of the armature 37. A suitable depression 46, centrally located with reference to the pole pieces 20 and 21, is formed in the member 41 and into which the pointed end 36' of the shaft 36 rests, thus forming a bearing for one end of the shaft 36. The other end $36^2$ of the shaft 36 is also provided with a pointed end and rests in a depression 47 in an adjustable bridge plate 48, thus forming the other bearing for the shaft 36. The ends 49 and 50 of the studs 42 and 43 are threaded and receive the nuts 51 and 52, which nuts have screw-threaded engagement with the threaded ends of the studs 42 and 43. The plate 48 may be adjusted up or down by means of the nuts 51 and 52 to properly adjust the shaft 36 in its bearings 46 and 47, and when this adjustment is secured, the nuts 54 and 55, which have screw-threaded engagement with the threaded ends 49 and 50, are tightened to clamp the bridge plate 48 in position.

A circular shaped permanent magnet 56 is fastened to a stud 57, which stud is secured to the mounting plate 2 in any suitable manner. A screw 58, having screw-threaded engagement with a suitable tapped orifice 59 in the stud 57, secures the magnet to the stud 57. The free ends 60 and 61 of the magnet 56 rest against the edges 62 and 63 the bridge plate 25, thus holding the poled ends 60 and 61 in operative relation with the armature 37. A dial plate 65 is also provided, the said plate having a counter-sunk portion 66 which rests in the counter-sunk portion 67 in the core 13. A screw 68, having screw-threaded engagement with a suitable tapped orifice 69 in the core 13, secures the dial plate 65 to the said core 13. A card 70 is suitably fastened to the dial plate 65 and is graduated to show the discharge or charge in amperes, depending in which direction the current is flowing, that is passing through the instrument. The indicator needle or pointer 38 is carried above this dial and oscillates back and forth as the current is increased and decreased. The cap 3 is provided with an opening 72 below which a transparent covering 73 is placed, the said glass being held in place by means of a spring ring 74. When the cover is in place, the dial may be readily read through this transparent member 73.

Having described the various parts of my device, I will now explain its function and use. Assuming that the instrument is used in connection with the lighting and ignition circuits of an automobile, it is so connected in circuit that current will flow through the coil C in one direction if the generator is charging the storage battery, and in the opposite direction if the storage battery is supplying current to the operating circuits. The legs 60 and 61 of the permanent magnet 56 are in the same plane as the flat elliptical shaped armature 37. The armature 37, being elliptical, its greatest width lies in the magnetic field created between the legs 60 and 61 of the permanent magnet 57; thus when no current is passing through the coil C, the indicator or pointer 38 points to zero. Should current now pass through the coil C in one direction, for example if the generator is charging the accumulator, the pole pieces 20 and 21 will be magnetized and lines of force will extend across between the pole pieces 20 and 21 and between the pole pieces 20, 21, and the pole pieces of the permanent magnet. The lines of force, of course, would extend directly across from pole piece 20 to pole piece 21, if it were not for the field set up by the permanent magnet, and the armature would turn at right angles the instant the magnet 13 was energized. The field created by the magnet 13 will cause the armature 37 to rotate, as is well understood, and this movement of the armature 37 causes the indicator 38 to be moved to the left to indicate that the storage battery is being charged and the graduations upon the dial indicate to what extent it is being charged. The stronger the field set up by the magnet 13, the greater the deflection will be of the pointer 38. Now should a current pass through the coil in the direction opposite to that just described, the armature 37 will rotate in the opposite direction, as is well understood, causing the indicator to move to the right and the graduations upon the dial face will indicate that the storage battery is supplying current to the operating circuits and the amount being supplied thereto.

From the foregoing description, it is believed that the application and functions of the device of my invention will be readily understood without illustrating or describing circuit arrangements in detail.

In illustrating my invention I have chosen a preferred form, but it is to be understood that many changes and modifications thereof may be made, and I, therefore, do not desire to be limited to the exact structure as shown, but aim to cover all such changes and modifications as come within the spirit and scope of the appended claims.

What I claim as new and desire to secure by United States Letters Patent, is:

1. An instrument of the character described including a mounting plate, an electromagnet secured to said mounting plate, a pair of pole pieces secured to the core of said electromagnet, a permanent magnet secured to said mounting plate, an armature supporting member, and a member for positioning the pole pieces of said electromagnet in position relative to the poles of said permanent magnet and to provide bearings for said armature supporting member.

2. An instrument of the character described including a mounting plate, an electromagnet comprising but one core and a single winding secured to said mounting plate, a pair of pole pieces for said electromagnet, a permanent magnet secured to said mounting plate, a member for positioning the pole pieces of said electromagnet relative to the free ends of said permanent magnet, and an armature pivotally supported by said positioning member.

3. An instrument of the character described including a mounting plate, an electromagnet comprising but one core and a single winding secured to said mounting plate, a pair of pole pieces for said electromagnet, a U-shaped permanent magnet secured to said mounting plate, a member for positioning the pole pieces of said electromagnet relative to the free ends of said permanent magnet, and an armature pivotally carried by said member in between said pole pieces and adapted to be operated in either of two directions depending upon the direction of the flow of current through said electromagnet.

4. A device of the character described including a mounting plate, a permanent magnet secured to said mounting plate, an electromagnet having a straight core with its ends reduced secured to said mounting plate and having pole pieces secured to said reduced ends and so arranged that the lines of force set up by said electromagnet, unaffected by the lines of force of said permanent magnet, are substantially at right angles to the lines of force of said permanent magnet, a soft iron rotatable armature held in its normal position by said permanent magnet but adapted to be rotated therefrom when current is passed through said electromagnet and means secured to said electromagnet for positioning said armature relative to said permanent magnet.

5. A device of the character described including a mounting plate, a permanent magnet secured to said mounting plate, an electromagnet secured to said mounting plate and provided with pole pieces so arranged that the lines of force set up by said electromagnet, unaffected by the lines of force of said permanent magnet, are substantially at right angles to the lines of force of said permanent magnet, a rotatable armature held in normal position by said permanent magnet but adapted to be rotated therefrom when current is passed through said electromagnet, a pointer operated by said armature in either of two directions dependent upon in which direction current flows through said electromagnet, and means supported by said electromagnet for positioning said pole pieces relative to the free ends of said permanent magnet and for pivotally supporting the said pointer in position.

6. A device of the character described including a mounting plate, a permanent magnet secured to said mounting plate, an electromagnet having a straight core with its ends reduced secured to said mounting plate and having a pair of pole pieces secured to said reduced ends, and a bridge piece for positioning said electromagnet and one of said pole pieces in their respective positions.

7. A device of the character described including a mounting plate, a permanent magnet secured to said mounting plate, an electromagnet secured to said mounting plate and provided with a pair of pole pieces and a bridge piece for positioning said electromagnet and one of said pole pieces in their respective positions, and an armature pivotally secured to said bridge piece.

8. An instrument of the character described including a mounting plate, an electromagnet secured to said mounting plate, a pair of pole pieces for said electromagnet, a permanent magnet secured to said mounting plate, a bridge member adapted to be mounted in such a manner that it positions the free ends of said permanent magnet and the free end of one of said pole pieces, and an armature pivotally mounted in said bridge piece and in operative relation to said pole pieces and the free ends of said permanent magnet.

9. An instrument of the character described including a mounting plate, an electromagnet secured to said mounting plate, a pair of pole pieces for said electromagnet, a permanent magnet secured to said mounting plate, a bridge member adapted to be mounted in such a manner that it positions the free ends of said permanent magnet and the free end of one of said pole pieces, said bridge piece being held in position by the other of said pole pieces, and an armature pivotally mounted on said bridge member and in operative relation to said pole pieces and the free ends of said permanent magnet.

10. An instrument of the character described including a mounting plate, an electromagnet attached to said mounting plate, a pair of pole pieces for said electromagnet, a bridge of nonmagnetic material secured at its one end to the core of said electromagnet and at its other end to one of said pole pieces, said bridge being provided with means for holding the other of said pole pieces in position, and an armature pivotally supported in said bridge and in operative relation with said pole pieces.

11. An instrument of the character described including a mounting plate, an electromagnet attached to said mounting plate, a pair of pole pieces for said electromagnet, a bridge of non-magnetic material secured at its one end to the core of said electromagnet and at its other end to one of said pole pieces, said bridge being provided with means for holding the other of said pole pieces in position, and a pivoted member carried by said bridge piece provided with an armature adapted to be actuated when said electromagnet is energized.

12. An instrument of the character described including a mounting plate, an electromagnet attached to said mounting plate, a pair of pole pieces for said electromagnet, a bridge of non-magnetic material secured at its one end to the core of said electromagnet and at its other end to one of said pole pieces, said bridge being provided with means for holding the other of said pole pieces in position, a pivoted member carried by said bridge provided with an armature adapted to be actuated when said electromagnet is energized, and a permanent magnet secured to said mounting plate, adapted to have its free ends positioned by said bridge piece.

13. An instrument of the character described including a mounting plate, an electromagnet having detachable pole-pieces secured to said mounting plate, a post fastened to said mounting plate, a permanent magnet connected to said post, a positioning and supporting member secured to said electromagnet for positioning one of said pole pieces relative to the free ends of said permanent magnet, an armature and an indicating needle pivotally mounted in position relative to said electromagnet and the free ends of said permanent magnet on said positioning and supporting member, and a scale secured to the said electromagnet.

14. An instrument of the character described including a mounting plate, an electromagnet having detachable pole-pieces secured to said mounting plate, a supporting member secured to said electromagnet, an armature and an indicating needle mounted on said supporting member and in position relative to said electromagnet, said supporting member positioning one of said pole-pieces in relative position with the free ends of said permanent magnet, and a scale secured to the said electromagnet.

15. An instrument of the character described including a mounting plate, an electromagnet having a core connected to said mounting plate, a pivotally supported armature and an indicating needle operable by said electromagnet, a supporting member having an orifice for receiving the said core to secure said member to said electromagnet, said armature and said needle pivotally supported by said member, and a scale attached to said electromagnet in front of which said needle operates.

16. An instrument of the character described including a mounting plate, an electromagnet having a core connected to said mounting plate, a supporting member having an orifice for receiving said core to secure said member to said electromagnet, an armature and an indicating needle operable by said electromagnet, and pivotally supported by said supporting member, and a scale attached to said electromagnet for co-operation with said needle to indicate the current flow through said electromagnet.

17. An instrument of the character described including a mounting plate, an electromagnet secured thereto provided with pole-pieces, a supporting element attached to said electromagnet, and a pair of bridge members secured to said supporting member pivotally supporting an armature and an indicating needle in position relative to the pole-pieces of said electromagnet.

18. In an electrical measuring instrument, a permanent magnet, an electromagnet provided with a straight core having its ends reduced, a pair of poles secured to said reduced ends and extending into proximity to the poles of the permanent magnet, thereby forming a magnetic circuit of extremely low reluctance, and a magnetically polarized needle provided with an index, the needle being located between the poles of the magnets.

19. An electrical measuring instrument having a permanent magnet with adjacent polar surfaces, a mounting plate, an electromagnet having poles secured thereto and extending into close proximity to said polar surfaces thereby forming a magnetic circuit of extremely low reluctance, and a core for said electromagnet provided with reduced ends to form shoulders, one of said electromagnet poles being secured between one of said shoulder portions of the core of said electromagnet and said mounting plate, the plane of the permanent magnet being at right angles to the plane of the electromagnet.

20. In an electrical measuring instrument, the combination with a permanent magnet having adjacent and parallel polar face portions, an electromagnet having a curved terminal portion extending into proximity to the polar face portions of the permanent magnet, a spacing device embracing the terminal portion of the electromagnet and having parallel side portions extending into contact with the parallel polar face portions, and an armature pivotally supported in said spacing device and held therein in operative relation to said polar face portions and said curved terminal portion.

21. In an electrical measuring instrument, a mounting plate, the combination of a permanent magnet having adjacent poles, an electromagnet provided with a straight core having its ends reduced, one of said ends extending into an opening in said mounting plate to position said electromagnet on and at right angles to said mounting plate, a moving system comprising a magnetically polarized needle and its support, and spacing means connected to the other reduced end of the core of the electromagnet and extending between the poles of the permanent magnet for definitely locating the electromagnet with reference to the poles of the permanent magnet.

22. In an electrical measuring instrument, a mounting plate, the combination of a permanent magnet having adjacent poles, an electromagnet provided with a straight core having its ends reduced, one of its ends extending into an opening in said mounting plate to position said electromagnet on and at right angles to said mounting plate, a moving system comprising a magnetically polarized needle and its support, and spacing means connected to the other reduced end of the core of said electromagnet and extending between the poles of the permanent magnet for definitely locating the electromagnet with reference to the poles of the permanent magnet, said spacing means being also constructed to definitely locate the moving system support with reference to the poles of the permanent magnet.

Signed by me at Chicago, county of Cook and State of Illinois, this 26th day of December, 1918.

WILLIAM KAISLING.